United States Patent
Cabrera Arevalo et al.

(10) Patent No.: US 12,493,793 B2
(45) Date of Patent: Dec. 9, 2025

(54) METHODS AND TECHNIQUES FOR DEEP LEARNING AT SCALE OVER VERY LARGE DISTRIBUTED DATASETS

(71) Applicant: Teradata US, Inc., San Diego, CA (US)

(72) Inventors: Wellington Marcos Cabrera Arevalo, El Segundo, CA (US); Anandh Ravi Kumar, Torrance, CA (US); Mohammed Al-Kateb, Rolling Hills Estates, CA (US); Sanjay Nair, El Segundo, CA (US); Sandeep Singh Sandha, Los Angeles, CA (US)

(73) Assignee: Teradata US, Inc., San Diego, CA (US)

( * ) Notice: Subject to any disclaimer, the term of this patent is extended or adjusted under 35 U.S.C. 154(b) by 1026 days.

(21) Appl. No.: 16/681,630

(22) Filed: Nov. 12, 2019

(65) Prior Publication Data

US 2020/0151575 A1  May 14, 2020

Related U.S. Application Data (60) Provisional application No. 62/760,643, filed on Nov. 13, 2018.

(51) Int. Cl.
*G06N 3/084* (2023.01)
*G06F 16/28* (2019.01)
*G06N 3/045* (2023.01)

(52) U.S. Cl.
CPC .......... *G06N 3/084* (2013.01); *G06F 16/284* (2019.01); *G06N 3/045* (2023.01)

(58) Field of Classification Search
None
See application file for complete search history.

(56) References Cited

U.S. PATENT DOCUMENTS 6,704,717 B1 * 3/2004 Tate .................... G06F 16/2465
706/50
10,152,676 B1 * 12/2018 Strom .................... G06N 20/00
(Continued)

FOREIGN PATENT DOCUMENTS

WO  WO-2017176356 A2 * 10/2017 ............. G06N 3/045

OTHER PUBLICATIONS

"R Enterprise User Guide Building a Neural Network Model". https://docs.oracle.com/cd/E67822_01/OREUG/GUID-72A885F5-68BF-4FC1-8551-7B8B60208F97.htm, Downloaded Nov. 11, 2019, 2 pages.
(Continued)

*Primary Examiner* — Kavita Stanley
*Assistant Examiner* — Cao D Vuong
(74) *Attorney, Agent, or Firm* — Gates & Cooper LLP (57) ABSTRACT

An apparatus, method and computer program product for neural network training over very large distributed datasets, wherein a relational database management system (RDBMS) is executed in a computer system comprised of a plurality of compute units, and the RDBMS manages a relational database comprised of one or more tables storing data. One or more local neural network models are trained in the compute units using the data stored locally on the compute units. At least one global neural network model is generated in the compute units by aggregating the local neural network models after the local neural network models are trained.

18 Claims, 7 Drawing Sheets

(56) References Cited

U.S. PATENT DOCUMENTS

| | | | |
|---|---|---|---|
| 10,810,491 B1* | 10/2020 | Xia | G06N 3/08 |
| 11,120,361 B1* | 9/2021 | Januschowski | G06N 3/084 |
| 2016/0267380 A1* | 9/2016 | Gemello | G06N 3/084 |
| 2017/0116520 A1* | 4/2017 | Min | G06N 3/098 |
| 2019/0163718 A1* | 5/2019 | Borje | G06F 17/175 |
| 2019/0197395 A1* | 6/2019 | Kibune | G06N 3/0454 |
| 2019/0258924 A1* | 8/2019 | Hamidouche | G06N 3/08 |
| 2019/0385043 A1* | 12/2019 | Choudhary | G06N 3/084 |
| 2020/0027033 A1* | 1/2020 | Garg | G06F 17/18 |
| 2020/0042362 A1* | 2/2020 | Cui | G06T 1/20 |

OTHER PUBLICATIONS

"Microsoft Neural Network Algorithm". Microsoft Docs, https://docs.microsoft.com/en-us/sql/analysis-services/data-mining/microsoft-neural-network-algorithm, Downloaded Nov. 11, 2019, 3 pages.

"Back Propagation Neural Network". : https://help.sap.com/viewer/2cfbc5cf2bc14f028cfbe2a2bba60a50/2.0.01/en-US/ddd236d66f394dea885f61cf5fdf8897.html, Downloaded Nov. 11, 2019, 12 pages.

"PGNeural: Machine Learning for PostgreSQL". Cybertec Data Science, https://www.cybertec-postgresql.com/en/products/pgneural/, Downloaded Nov. 11, 2019, 4 pages.

"GitHub—apache/madlib: Mirror of Apache MADlib". https://github.com/apache/madlib, Downloaded Nov. 11, 2019, 5 pages.

LeCun et al., "The MNIST Database of Handwritten Digits". http://yann.lecun.com/exdb/mnist/, Downloaded Nov. 11, 2019, 5 pages.

"A MNIST-like fashion product database. Benchmark". https://github.com/zalandoresearch/fashion-mnist, Downloaded Nov. 11, 2019, 12 pages.

Zalando—Shoes and Fashion Online. https://zalando.com/, Downloaded Nov. 11, 2019, 1 page.

Sandha et al., "In-database Distributed Machine Learning: Demonstration using Teradata SQL Engine". PVLDB, 12 (12): pp. 1854-1857, 2019.

* cited by examiner

FIG. 3 label=5 label=0 label=4 label=1 label=9 label=2 label=1 label=3 label=1 label=4 label=3 label=5 label=3 label=6 label=3 label=7 label=2 label=8 label=6 label=9

METHODS AND TECHNIQUES FOR DEEP LEARNING AT SCALE OVER VERY LARGE DISTRIBUTED DATASETS

CROSS REFERENCE TO RELATED APPLICATIONS

This application is related to the following co-pending and commonly-assigned application:

U.S. Provisional Patent Application Ser. No. 62/760,643, filed on Nov. 13, 2018, by Wellington Marcos Cabrera Arevalo, Anandh Ravi Kumar, Mohammed Hussein Al-Kateb, and Sanjay Nair, and entitled "METHODS AND TECHNIQUES FOR DEEP LEARNING AT SCALE OVER VERY LARGE DISTRIBUTED DATASETS,";

which application is incorporated by reference herein.

BACKGROUND OF THE INVENTION

1. Field of the Invention

This invention relates to methods and techniques for deep learning at scale over very large distributed datasets.

2. Description of Related Art (Note: This application references a number of different publications as indicated throughout the specification by one or more reference numbers within brackets [x]. A list of these different publications ordered according to these reference numbers can be found below in the section entitled "References." Each of these publications is incorporated by reference herein.)

With the rising amount of data and its complexity, machine learning (ML) techniques, such as deep learning, are being used to provide state-of-the-art accuracies in speech recognition, visual object detection, genomics, Internet of Things (IoT), etc., using large amounts of data, also known as big data. Deep learning comprises machine learning techniques based on artificial neural networks, known as deep neural networks.

The evolution of distributed databases have addressed the challenge of managing such large amounts of data. However, databases today lack the capability to support deep neural networks at scale natively within the database.

The need to provide analytics over large amounts of data has led to development of many commercial and open-source analytics platforms. However, current analytics platforms have either or both of the following drawbacks:

1. Unnecessary data movement: Moving very large datasets from the database to the application end takes a lot of time, duplicates the storage, and wastes compute cycles.
2. Lack of scalability: Training deep neural networks in a centralized fashion limits the scalability to a great extent, especially with very large datasets that may not fit in a single machine storage and compute capabilities.

One of the major reasons behind these drawbacks is the existence of separate infrastructures for big data management and training of deep neural networks.

Current state-of-art solutions can be divided into two categories:
1. Solutions that exist outside the database infrastructure, such as Tensorflow™, Keras™, Pytorch™, etc.
2. Current support in other commercial and open-source databases.

Solutions in the first category are used extensively by the big data community, due to limited support in current databases. However, all these solutions require the data to be moved outside of the distributed database engines. In case of very large datasets, these solutions assume the availability of data in small batches or chunks. Therefore, these solutions leave it up to the user to provide a dataset in batches.

Notwithstanding the significance of deep neural networks, limited support has been added in other commercial and open-source databases. The Oracle™ database supports only binary classification for multilayer neural networks [1]; the Microsoft SQL Server™ provides support for a 3-layer neural network [2]; and the SAP HANA™ supports neural networks via stored procedures [3]. Several libraries, such as Pgneural™ [4], provide machine learning functions within Postgresql™. The Apache Madlib™ [5] is an open source initiative to provide machine learning capabilities using SQL. All of these solutions are in their infancy, and little is known about their training procedures.

Thus, there is a need in the art for improved methods and techniques for deep learning at scale over very large distributed datasets. The present invention satisfies this need.

SUMMARY OF THE INVENTION

One or more embodiments of the invention provides an apparatus, method and computer program product for neural network training over very large distributed datasets, comprising: a relational database management system (RDBMS) executing in a computer system comprised of a plurality of compute units, wherein the RDBMS manages a relational database comprised of one or more tables storing data; one or more local neural network models are trained in the compute units using the data stored locally on the compute units; and at least one global neural network model is generated in the compute units by aggregating the local neural network models after the local neural network models are trained.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

Enabling advanced analytics, such as deep neural networks, at scale is a key need for pervasive data intelligence. Many solutions exist today to train deep neural networks, but they incur the overhead of moving data from databases to perform such training.

The present invention provides a native in-database solution to train deep neural networks at scale in distributed databases. Specifically, the present invention discloses novel methods and techniques to train deep neural networks that offer unique innovations including:

1. Enabling training of deep neural network models natively inside the database engine to avoid the data movement to external sources.
2. Distributing the task of training a deep neural network to provide scalability.

The present invention can train multiple local neural networks in parallel using local data, wherein the local neural networks are later aggregated to condense the knowledge from the entire dataset into a single global neural network. A prototype has been implemented and experiments using real datasets show the value of this invention for training deep neural networks over very large datasets. The techniques used provide a large performance edge over other solutions in terms of performing analytics at scale. Moreover, this invention can be easily adopted by and implemented in various commercial database systems and open-source platforms.

The focus of this invention is to add the capabilities of training deep neural networks at scale to distributed database infrastructure. The main contributions of this invention are as follows:

1. To overcome the challenge of data movement and data duplication by enabling the computations of training deep neural networks in the database.
2. To provide scalability by training multiple neural networks simultaneously in a distributed fashion using local data.

Specifically, the present invention discloses a novel scalable solution, which can enrich the analytics within a relational database management system (and other distributed databases with shared-nothing architecture), by providing a competitive edge to train neural networks in a distributed fashion without data movement, redistribution or duplication.

Hardware and Software Environment

Figure 1:
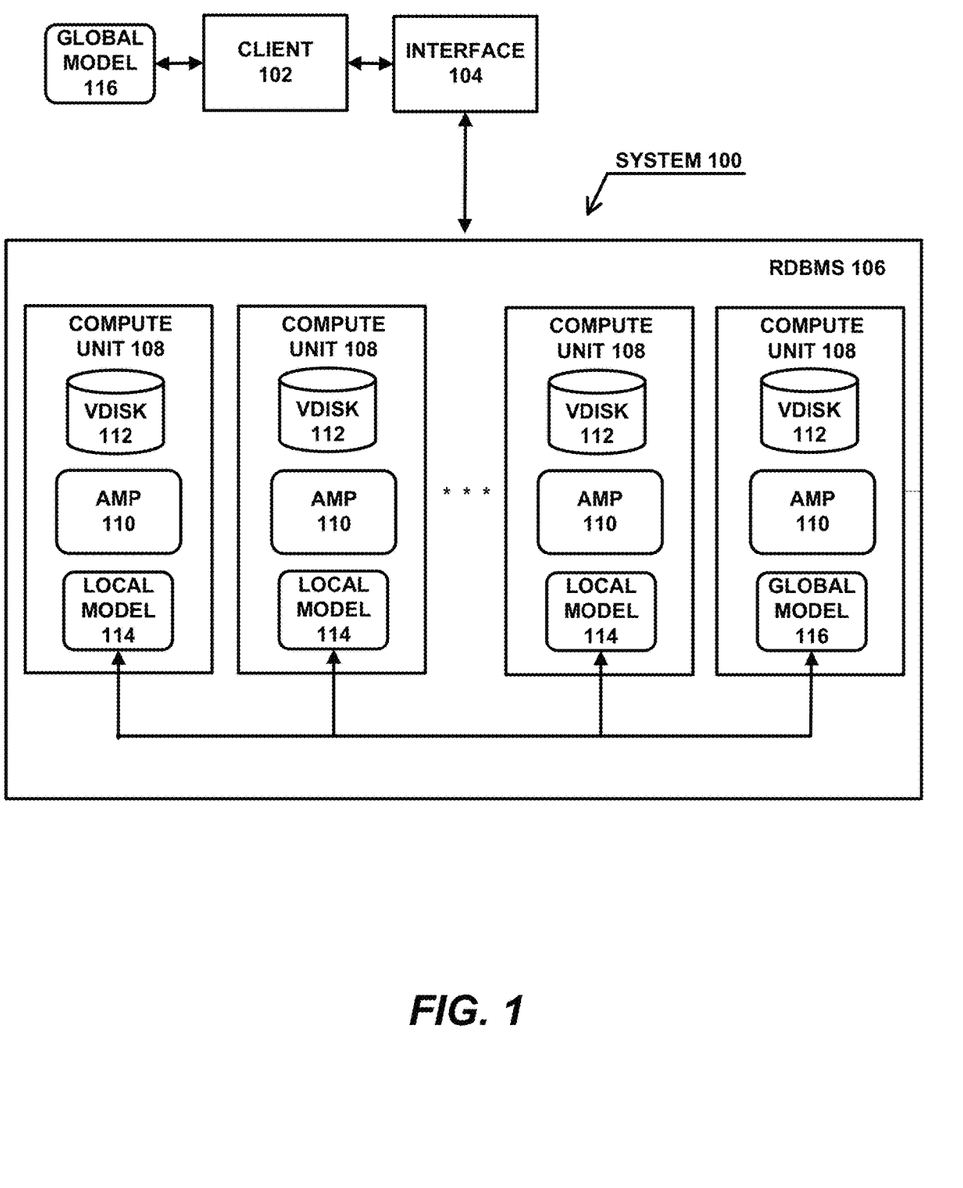
FIG. 1 illustrates an exemplary hardware and software environment according to the preferred embodiment of the present invention.

FIG. 1 illustrates an exemplary hardware and software environment according to the preferred embodiment of the present invention. In the exemplary environment, a computer system 100 implements an improved neural network training framework, in a three-tier client-server architecture, wherein the first or client tier provides clients 102 that may include, inter alia, a graphical user interface (GUI), the second or middle tier provides an interface 104 for interfacing with a central database or data warehouse, and the third or server tier comprises the central database or data warehouse, which is a Relational DataBase Management System (RDBMS) 106 that stores data and metadata in a relational database. The first, second, and third tiers may be implemented in separate machines, or may be implemented as separate or related processes in a single machine.

In the preferred embodiment, the RDBMS 106 includes one or more compute units 108, e.g., processors, executing one or more access module processors (AMPs) 110 performing the functions of the RDBMS 106 and one or more virtual disks (VDISKs) 112 storing the relational database of the RDBMS 106. The compute units 108, AMPs 110, and VDISKs 112, may be implemented in separate machines, or may be implemented as separate or related processes in a single machine.

The RDBMS 106 used in the preferred embodiment comprises the Teradata® RDBMS sold by Teradata™ US, Inc., the assignee of the present invention, although other DBMS's could be used. In this regard, Teradata® RDBMS is a hardware and software based data warehousing and analytic application/database system.

Generally, operators or users of the system 100 use the clients 102 to formulate requests for the RDBMS 106, wherein the requests are transmitted via the interface 104 to access data stored in the RDBMS 106, and responses are received therefrom. In response to the requests, the RDBMS 106 performs the functions described below, including performing neural network training in the RDBMS 106 and processing data retrieved from the RDBMS 106. Moreover, the results from these functions may be provided directly to clients 102, or may be provided to other systems (not shown) by the interface 104, or may be stored by the RDBMS 106 in the relational database.

Note that, in one or more embodiments, the system 100 may use any number of different parallelism mechanisms to take advantage of the parallelism offered by the multiple tier architecture, the client-server structure of the client 102, interface 104, and RDBMS 106, and the multiple AMPs 110 and VDISKs 112 of the RDBMS 106. Further, data within the relational database may be partitioned across multiple data storage devices to provide additional parallelism.

Generally, the clients 102, interface 104, RDBMS 106, compute units 108, AMPs 110 and VDISKs 112 comprise hardware and/or software, including logic and/or data tangibly embodied in and/or accessible from a device, media, carrier, or signal, such as RAM, ROM, one or more of the data storage devices, and/or a remote system or device communicating with the computer system 100 via one or more data communications devices. The above elements 102-112 and/or operating instructions may also be tangibly embodied in memory and/or data communications devices, thereby making a computer program product or article of manufacture according to the invention. As such, the terms "article of manufacture," "program storage device" and "computer program product" as used herein are intended to encompass a computer program accessible from any computer readable device or media. Accordingly, such articles of manufacture are readable by a computer and embody at least one program of instructions executable by a computer to perform various method steps of the invention.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Technical Description

In one embodiment, the RDBMS 106 stores training data for deep neural networks in the relational database, wherein the deep neural networks are represented in the system 100 by local and global neural network models 114, 116. As noted above, the accuracy of deep neural networks comes at the cost of huge training datasets, which are generally stored in distributed databases. To avoid data movement, the present invention enables the training of deep neural networks locally inside a database system, namely the RDBMS 106. Specifically, the AMPs 110 access training data stored locally in the VDISKs 112 to train the local neural network models 114, and the local neural network models 114 are then aggregated in the global neural network model 116 by one of the AMPs 110.

In this embodiment, the present invention comprises: the RDBMS 106 executing in a computer system comprised of a plurality of compute units 108, wherein the RDBMS manages a relational database comprised of one or more tables storing data; one or more local neural network models 114 are trained in the compute units 108 in parallel by the AMPs 110 using data stored locally on the compute units 108 in the VDISKs 112, and the data is not moved among the compute units 108 when training the local neural network models 114; and at least one global neural network model 116 is generated in the compute units 108 by aggregating the local neural network models 114 collected from the AMPs 110 using an AVG (average) operator by one of the AMPs 110, after the local neural network models 114 are trained.

The local neural network models 114 are trained by: creating the global neural network model 116; distributing the global neural network model 116 to the compute units 108 as the local neural network models 114; and training the local neural network models 114 using back propagation with an appropriate loss function to update weights using the data stored locally on the compute units 108.

Thereafter, the local neural network models 114 are aggregated into the global neural network model 116 by: collecting the local neural network models 114 from the compute units 108; and aggregating the collected local neural network models 114 in the global neural network model 116 using either regular or weighted averages where weights are proportional to the data used to train the local neural network models 114. Moreover, it is possible to use different techniques to decide the weights, including custom weighting. For example, weights proportional to the amount of data may be used, or weights proportional to the quality of the data may be used, or weights based on any other importance matrix may be used.

The local neural network models 114 are trained until a desired metric is achieved in the global neural network model 116, or until a specified number of training iterations are completed. Specifically, the global neural network model 116 uses test data to determine whether the desired metric is achieved, indicating that the global neural network model 116 is converging correctly. Thereafter, the global neural network model 116 may be transmitted via the interface 104 to the client 102, and/or stored in the RDBMS 106, and/or transmitted to the compute units 108 for use as the local neural network models 114 in a next training iteration.

Figure 2:
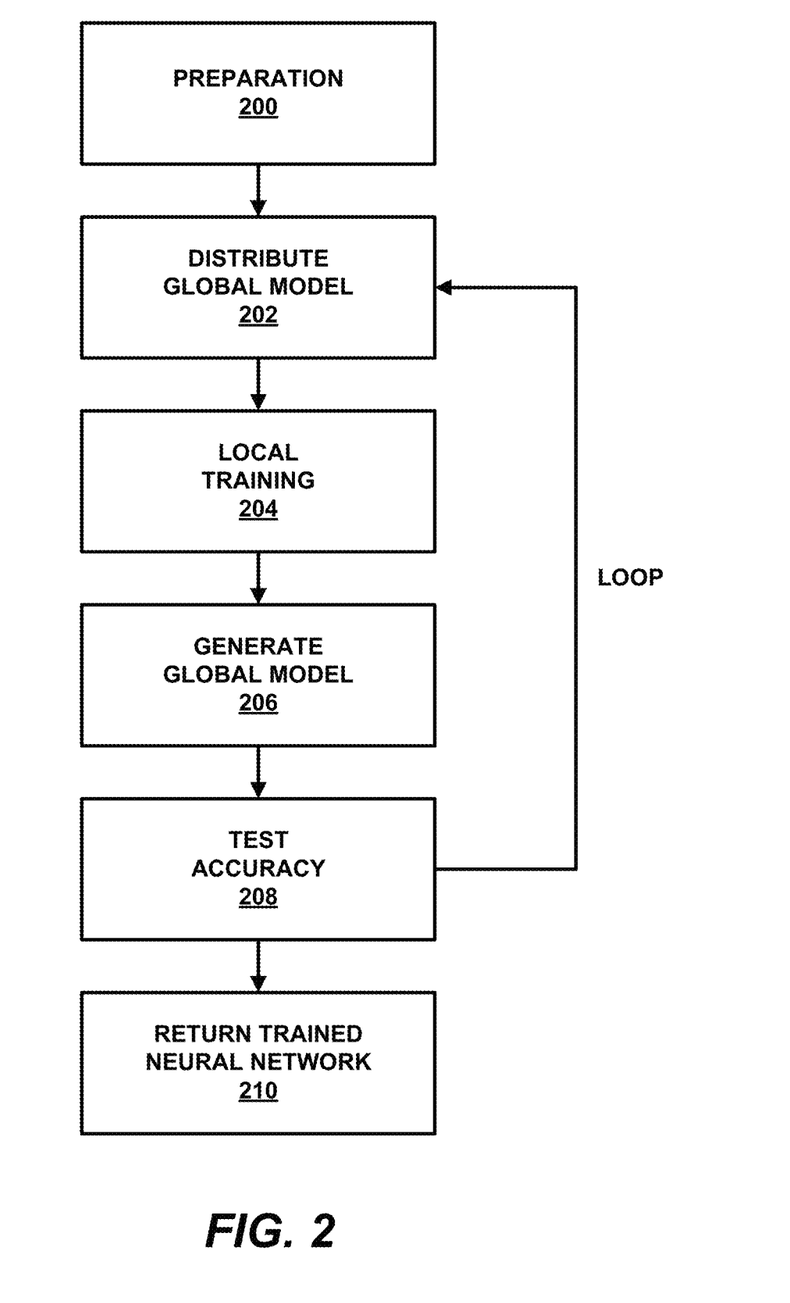
FIG. 2 is a flowchart that illustrates exemplary steps and functions performed by the present invention.

The steps and functions performed by the present invention are shown in FIG. 2 and described below.

At Block 200, a Preparation step or function is performed by one or more of the AMPs 110. This step or function creates an initial global neural network model 116 based on a required model architecture and dataset.

At Block 202, a Distribute Global Model step or function is performed by one or more of the AMPs 110. This step or function distributes the global neural network model 116 to the compute units 108 for use as the local neural network models 114 in a first or next iteration of the training.

At Block 204, a Local Training step or function is performed by one or more of the AMPs 110. The goal of Local Training is to train the local neural network models 114 using back propagation with an appropriate loss function to update weights. This Local Training can be performed using any optimization algorithm, such as batch stochastic gradient descent. The Local Training is performed by the AMPs 110 using the locally available data in the VDISKs 112. The purpose of the Local Training is preferably to avoid any data movement between the compute units 108. After performing the Local Training, each compute unit 108 and AMP 110 has a different local neural network model 114.

At Block 206, a Generate Global Model step or function is performed by one of the AMPs 110. Collecting all the local neural network models 114 and their corresponding weights from the compute units 108, the local neural network models 114 are aggregated by one of the AMPs 110 to obtain the global neural network model 116. This step or function distills the knowledge of the entire dataset into the single global neural network model 116. In one embodiment, the aggregation of local neural network models 114 is performed using either regular or weighted averages where the weights are proportional to the number of training data points present in each compute unit 108.

At Block 208, a Test Accuracy step or function is performed by one of the AMPs 110. This step or function tests the accuracy of the global neural network model 116 using test data. The Test Accuracy 208 is one of the metrics used to indirectly monitor the training of the local neural network models 114 and/or directly determine whether the global neural network model 116 is converging in the right direction. Other metrics, such as validation accuracy, validation cost, test cost, training accuracy, training cost, etc., can be used as well. Moreover, a loop to Block 202 may be performed, wherein the global neural network model 116 may be distributed back to the compute units 108 as the local neural network models 114 for use in a next iteration of Local Training 204, for example, until a desired level of Test Accuracy 208 is attained or until a specified number of iterations is reached.

At Block 210, a Return Trained Neural Network step or function is performed by one of the AMPs 110. This step or function returns the global neural network model 116, along with its test accuracy and number of training iterations, via the interface 104 to the client 102. In addition, the global neural network model 116 may be stored in the relational database of the RDBMS 106 and/or delivered via the interface 104 to other systems.

Experimental Results

Figure 3:
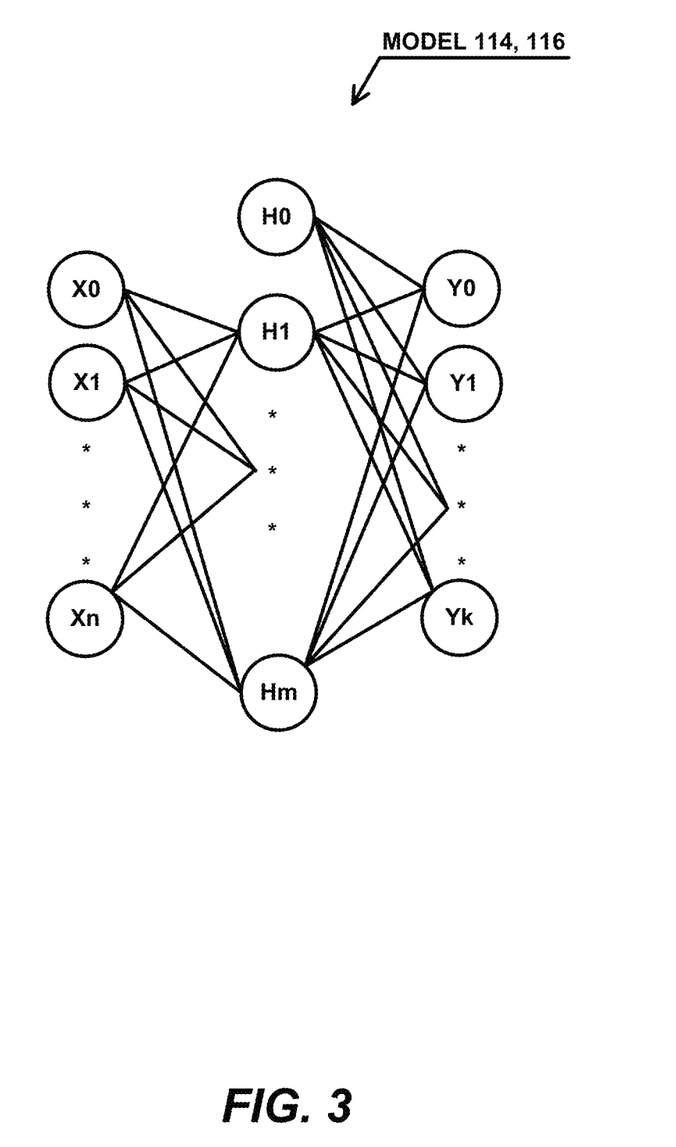
FIG. 3 is a diagram that illustrates an architecture of a 3-layer fully-connected neural network model according to one embodiment of the present invention.

A working prototype of the present invention was implemented to train a 3-layer fully-connected neural network model 114, 116 that could be used for any classification problem. [6] As shown in FIG. 3, the 3-layer fully-connected neural network model 114, 116 is comprised of an input layer of nodes X0, X1, ..., Xn, a hidden layer of nodes H0, H1, ..., Hm, and an output layer of nodes Y0, Y1, ..., Yn. In one embodiment, the input layer X and hidden layer H nodes are bias nodes, wherein the input layer X and hidden layer H nodes use a rectified linear unit (RELU) activation function, while the output layer Y nodes use a Softmax activation function.

The size of input layer X, output layer Y and hidden layer H nodes can be specified based on the desired complexity of the 3-layer fully-connected neural network model 114, 116. Indeed, the 3-layer fully-connected neural network model 114, 116 can handle very large datasets and can have arbitrary sizes of input layer X, output layer Y and hidden layer H nodes, subject only to the constraints of the RDBMS 106.

The Local Training step or function 204 was implemented using an external table operator in the RDBMS 106, wherein the data from one or more tables in the RDBMS 106 is loaded or unloaded into an external table, and the data is converted, if necessary, to match data types in the external table. In addition, a batch stochastic gradient descent algorithm was used in the Local Training step or function 204 and back propagation was implemented to train the local neural network models 114. In addition, cross entropy was used as a loss function in the local neural network models 114.

The input data, neural network model preparation, and training iterations are discussed below:

Input data: The neural network training data and test data were stored in relational tables of the RDBMS 106. Each AMP 110 trained its local neural network model 114 using the locally available data from the VDISK 112.

Neural network model preparation: The parameters of the local neural network model 114 were maintained using a model table in the relational database, wherein the parameters of each of the local neural network models 114 were stored in the corresponding VDISK 112. After each iteration, the parameters of the global neural network model 114 were updated by taking the aggregation of all of the parameters for the local neural network models 114. A table operator performed by the AMPs 110 served as a way to store the local neural network models 114 to the relational database. In order to perform testing, a separate table operator was developed, which performed parallel testing of the local neural network models 114 on each of the AMPs 110, as well as the testing of the global neural network model 116 on its AMP 110.

Training iterations: The training iterations were performed by invoking a neural network table operator in the AMPs 110. The aggregation of the local neural network models 114 into the global neural network model 116 was performed using an average (AVG) function in the AMPs 110, and then the global neural network model 116 was updated directly to the relational database. The status of current accuracy and iteration count was also maintained in the relational database.

Figure 4:
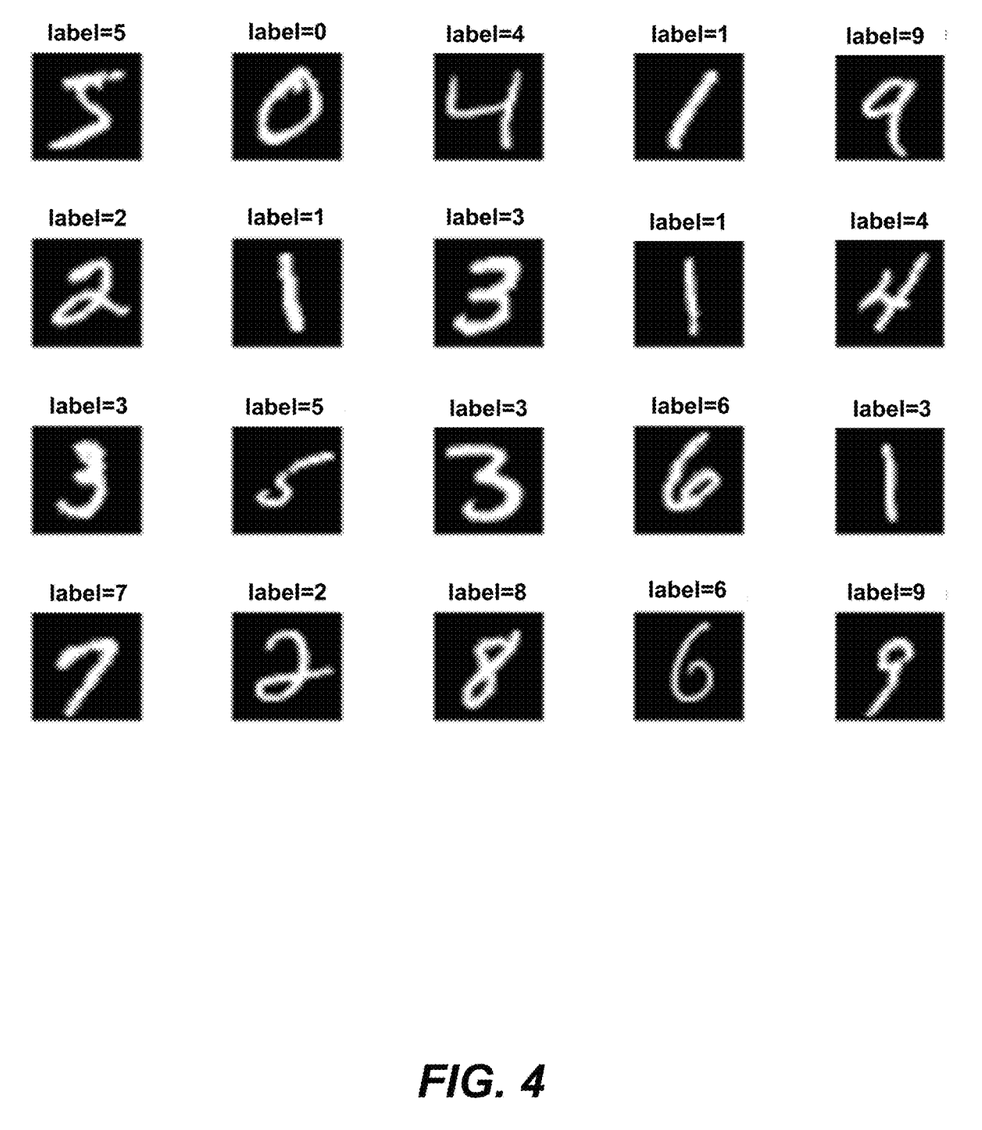
FIGS. 4 and 5 illustrate experimental data used with a working prototype of the present invention.
Figure 5:
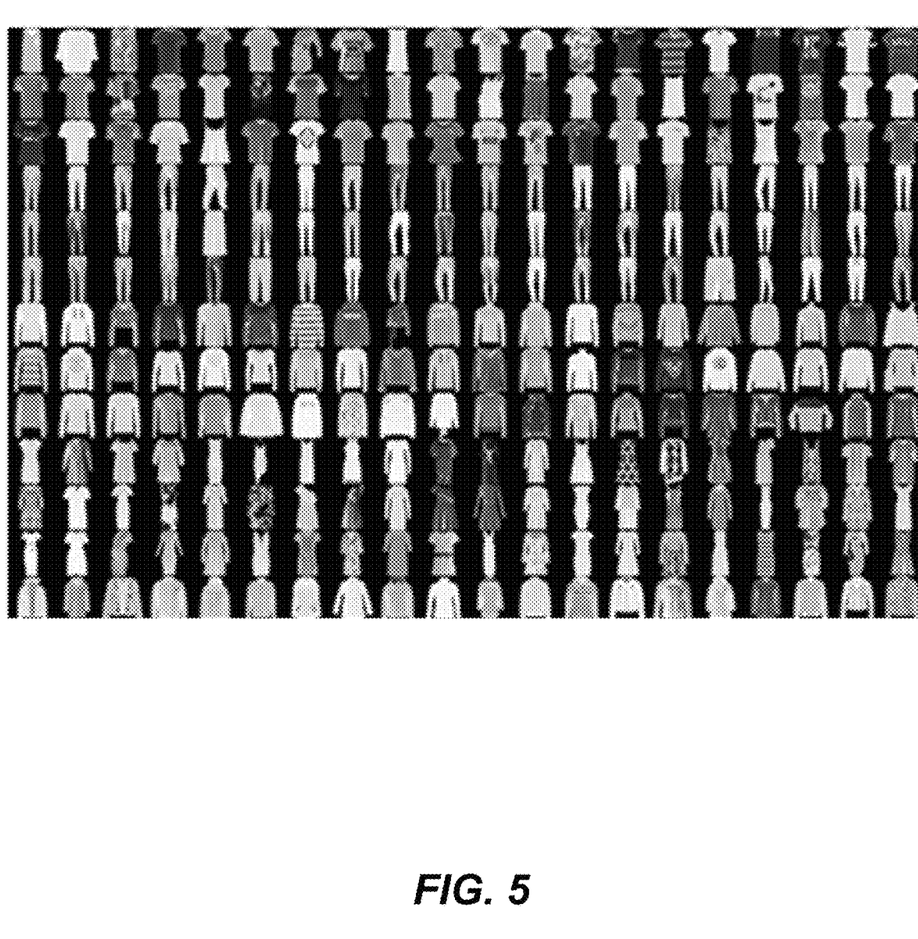

The inventors experimented with the working prototype using training and testing data from MNIST [7] and Fashion-MNIST [8] datasets. FIG. 4 illustrates samples from the MNIST dataset, which is comprised of images of handwritten digits, and FIG. 5 shows samples from the Fashion-MNIST dataset, which is comprised of Zalando [9] article images. Both the MNIST and Fashion-MNIST datasets have the same sizes (60,000 training images and 10,000 test images) and the same input dimensions; however, Fashion-MNIST is a more complex dataset.

These results with these datasets shows the correctness and convergence of the working prototype, as well the concepts of the present invention, as described below:

Model Architecture: Input layer X nodes=784; hidden layer H nodes=16; and output layer Y nodes=10.

Machine details: 4 compute nodes 108, each with 8 GB RAM and 4 cores operating at 2.2 GHz.

Model size and memory used: 12,730 parameters with 1.00 Mb per AMP 110.

Training parameters: Learning rate=0.05 with no decay; batch size=100; and a momentum term with weight of 0.001 and decay of 0.5 was used.

The training data of 60,000 images was stored in a table with 794 columns, where 784 columns were used to store the input image (28,28) pixels and 10 columns were used for output labels. The testing data of 10,000 images was stored in another table. The time required for each iteration was ~16.5 seconds.

Figure 6:
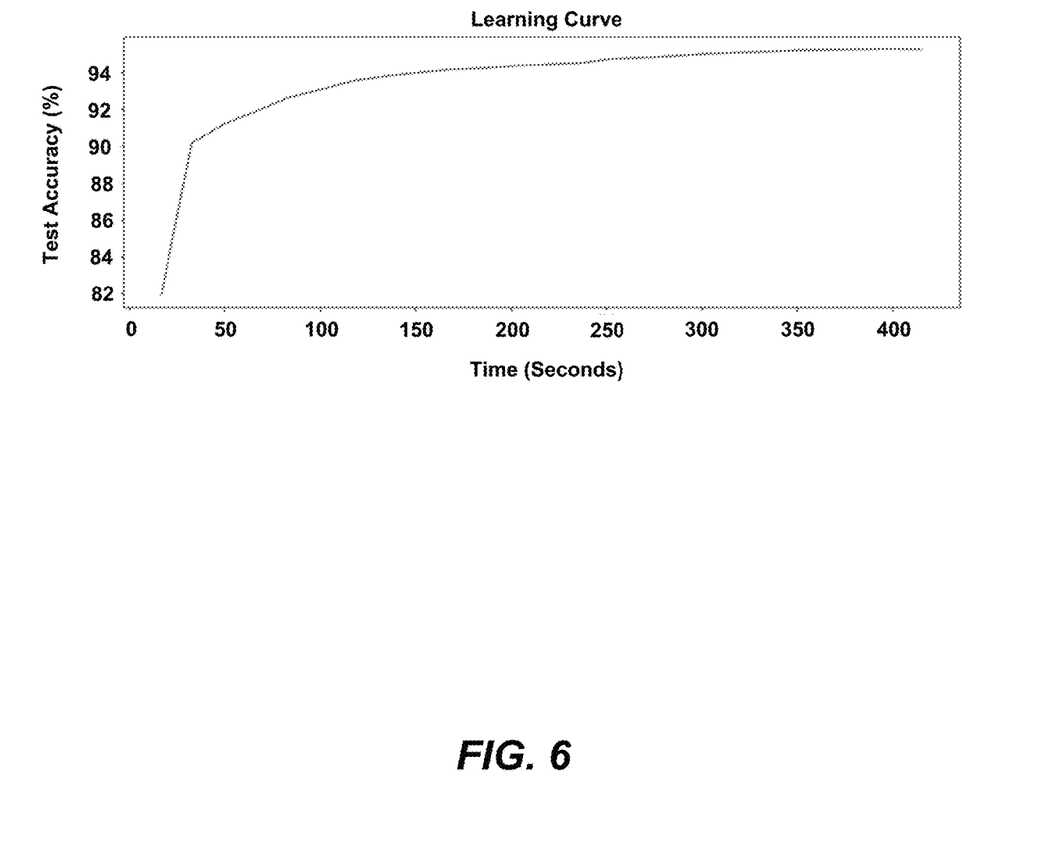
FIGS. 6 and 7 are graphs showing the learning curves on the MNIST and Fashion-MNIST datasets, respectively.

FIG. 6 is a graph that shows a learning curve for the working prototype trained on the MNIST dataset for a system 100 having four compute nodes 108 using a 3-layer neural network model 114, 116. Each AMP 110 trained its local neural network model 114 in a distributed fashion. In this setting, the working prototype trained four local neural network models 114 in parallel and aggregated the local neural network models 114 to the global neural network model 116 after each iteration. The local neural network models 114 achieved a test accuracy >90% in less than 50 seconds for 3 iterations, and the global neural network model 116 achieved a test accuracy >95% in 400 seconds.

Figure 7:
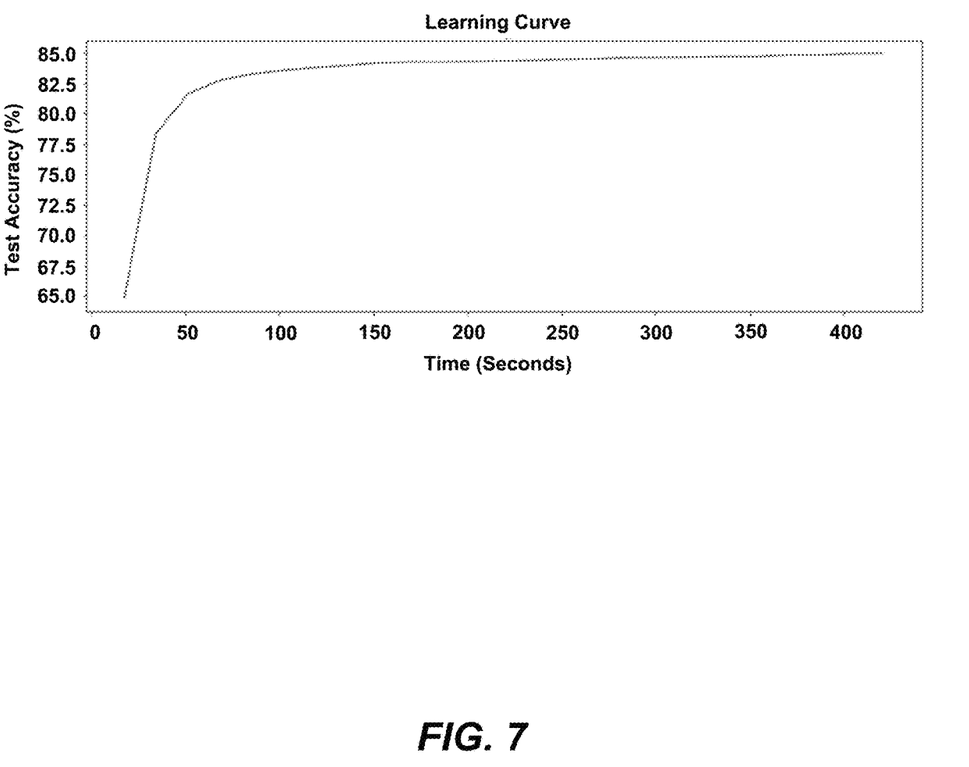

FIG. 7 is a graph that shows a learning curve for the working prototype trained on the Fashion-MNIST dataset for a system 100 having 4 compute nodes 108 using a 3-layer neural network 114, 116. The present invention trained four local neural network models 114 and aggregated the local neural network models 114 to the global neural network model 116 after each iteration. The local neural network models 114 achieved a test accuracy >80% in less than 50 seconds for 3 iterations, while the global neural network model 116 achieved a test accuracy >85% in 400 seconds.

The results from the training of the working prototype using the MNIST and Fashion MNIST datasets show that the approach of the present invention can train local neural network models 114 in parallel on each AMP 110 without data movement.

REFERENCES

The following publications are incorporated by reference herein:

[1] Neural Networks in Oracle: docs.oracle.com/cd/E67822_01/OREUG/GUID-72A885F5-68BF-4FC1-8551-7B8B60208F97.htm

[2] Neural Networks in Microsoft SQL Server: docs.microsoft.com/en-us/sql/analysis-services/data-mining/microsoft-neural-network-algorithm

[3] Neural Networks in SAP: help.sap.com/viewer/2cfbc5cf2bc14f028cfbe2a2bba60a50/2.0.01/en-US/ddd236d66f394dea885f61 cf5fdf8897.html

[4] Library pgneural: www.cybertec-postgresql.com/en/products/pgneural/

[5] Apache Madlib: github.com/apache/madlib

[6] Sandha, Sandeep Singh, Wellington Cabrera, Mohammed Al-Kateb, Sanjay Nair, and Mani Srivastava, "In-database distributed machine learning: demonstration using Teradata SQL engine," Proceedings of the VLDB Endowment 12, No. 12 (August 2019): 1854-1857.

[7] MNIST dataset: yann.lecun.com/exdb/mnist/

[8] Fashion-MNIST dataset:github.com/zalandoresearch/fashion-mnist

[9] Zalando: www.zalando.com/

CONCLUSION

The present invention discloses a native in-database solution for training deep neural networks at scale in distributed systems. The prototype implementation shows the feasibility and promise of this invention for advanced analytical tasks on complex high dimensional datasets. For pervasive data intelligence, having such a capability will provide significant competitive advantages.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented apparatus, comprising:
   (a) a relational database management system (RDBMS) executing in a computer system comprised of a plurality of compute units, wherein the RDBMS manages a relational database comprised of one or more tables storing data that is partitioned across the compute units;
   (b) at least one global neural network model is distributed to the compute units for use as one or more local neural network models in a first training iteration;
   (c) the local neural network models are trained in the compute units in the first training iteration using the data that is partitioned and stored locally on the compute units, while avoiding movement of the data that is partitioned between the compute units;
   (d) the global neural network model is updated by aggregating the local neural network models, after the local neural network models are trained in the compute units in the first training iteration;
   (e) the updated global neural network model is transmitted to the compute units for use as the local neural network models in a next training iteration; and
   (f) the local neural network models are trained in the compute units in the next training iteration using the data stored locally on the compute units.

2. The apparatus of claim 1, wherein the local neural network models are trained in the RDBMS.

3. The apparatus of claim 1, wherein the global neural network model is generated in the RDBMS.

4. The apparatus of claim 1, wherein the tables are distributed across the compute units.

5. The apparatus of claim 1, wherein the local neural network models are trained in parallel on the compute units and the data is not moved among the compute units.

6. The apparatus of claim 1, wherein the local neural network models are trained by:
   creating the global neural network model;
   distributing the global neural network model to the compute units as the local neural network models; and
   training the local neural network models using back propagation with appropriate loss function to update weights using the data stored locally on the compute units.

7. The apparatus of claim 1, wherein the local neural network models are aggregated by:
   collecting the local neural network models from the compute units; and
   aggregating the collected local neural network models in the global neural network model using regular or weighted averages where weights are proportional to the data used to train the local neural network models.

8. The apparatus of claim 1, wherein the local neural network models are trained until a desired metric is achieved in the global neural network model.

9. The apparatus of claim 8, wherein the global neural network model uses test data to determine whether the desired metric is achieved, indicating that the global neural network model is converging correctly.

10. The apparatus of claim 1, wherein the local neural network models are trained until a specified number of training iterations are completed.

11. A computer-implemented method, comprising:
    (a) executing a relational database management system (RDBMS) in a computer system comprised of a plurality of compute units, wherein the RDBMS manages a relational database comprised of one or more tables storing data that is partitioned across the compute units;
    (b) distributing at least one global neural network model to the compute units for use as one or more local neural network models in a first training iteration;
    (c) training the local neural network models in the compute units in the first training iteration using the data that is partitioned and stored locally on the compute units, while avoiding movement of the data that is partitioned between the compute units;
    (d) updating the global neural network model by aggregating the local neural network models after the local neural network models are trained in the compute units in the first training iteration;
    (e) transmitting the updated global neural network model to the compute units for use as the local neural network models in a next training iteration; and
    (f) training the local neural network models in the compute units in the next training iteration using the data stored locally on the compute units.

12. The method of claim 11, wherein the local neural network models are trained in the RDBMS, the global neural network model is generated in the RDBMS, and the tables are distributed across the compute units.

13. The method of claim 11, wherein the local neural network models are trained by:
    creating the global neural network model;
    distributing the global neural network model to the compute units as the local neural network models; and
    training the local neural network models using back propagation with appropriate loss function to update weights using the data stored locally on the compute units.

14. The method of claim 11, wherein the local neural network models are aggregated by:
    collecting the local neural network models from the compute units; and
    aggregating the collected local neural network models in the global neural network model using regular or weighted averages where weights are proportional to the data used to train the local neural network models.

15. The method of claim 11, wherein the local neural network models are trained until a desired metric is achieved in the global neural network model.

16. The method of claim 15, wherein the global neural network model uses test data to determine whether the desired metric is achieved, indicating that the global neural network model is converging correctly.

17. The method of claim 11, wherein the local neural network models are trained until a specified number of training iterations are completed.

18. A computer program product, the computer program product comprising a computer readable storage medium having program instructions embodied therewith, the program instructions executable by a computer system to cause the computer system to perform a method, comprising:

(a) executing a relational database management system (RDBMS) in a computer system comprised of a plurality of compute units, wherein the RDBMS manages a relational database comprised of one or more tables storing data that is partitioned across the compute units;
(b) distributing at least one global neural network model to the compute units for use as one or more local neural network models in a first training iteration;
(c) training the local neural network models in the compute units in the first training iteration using the data that is partitioned and stored locally on the compute units, while avoiding movement of the data that is partitioned between the compute units;
(d) updating the global neural network model by aggregating the local neural network models after the local neural network models are trained in the compute units in the first training iteration;
(e) transmitting the updated global neural network model to the compute units for use as the local neural network models in a next training iteration; and
(f) training the local neural network models in the compute units in the next training iteration using the data stored locally on the compute units.

* * * * *